Oct. 26, 1965  D. T. NORDVIK  3,214,300
PRESSURE RELIEF DEVICE FOR SEALED ELECTRIC CELLS
Filed Oct. 4, 1962
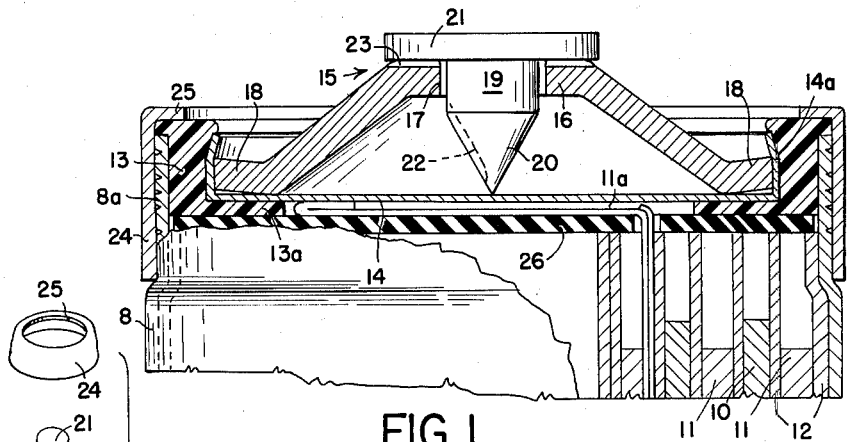
FIG. 1
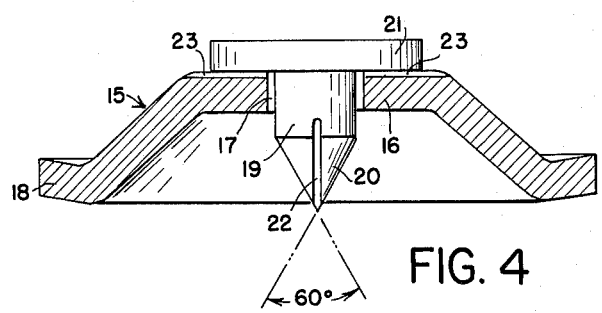
FIG. 4
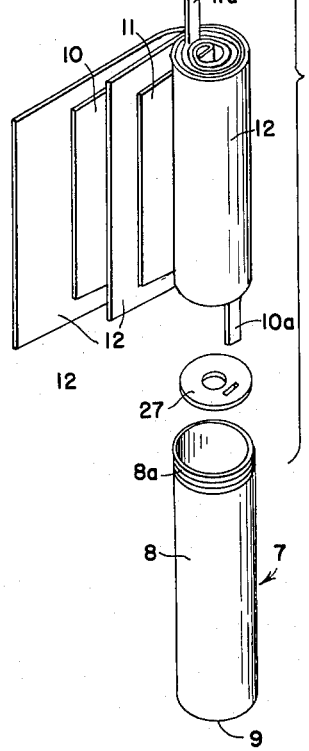
FIG. 2
FIG. 3
FIG. 5
INVENTOR.
DONALD T. NORDVIK
BY
ATTORNEY

United States Patent Office 3,214,300
Patented Oct. 26, 1965

3,214,300
PRESSURE RELIEF DEVICE FOR SEALED
ELECTRIC CELLS
Donald T. Nordvik, Brooklyn Park, Minn., assignor to Gould-National Batteries, Inc., a corporation of Delaware
Filed Oct. 4, 1962, Ser. No. 228,440
6 Claims. (Cl. 136—178)

This invention relates to a pressure relief device for rechargeable sealed electric cells wherein dangerously high internal gas pressures may develop as a result of overcharging, overdischarging, or other treatment causing malfunctioning of the cell. The present invention is an improvement over the sealing and pressure relief device described in the application of Raymond L. Schenk, Jr., Serial No. 94,475, filed March 9, 1961, now Patent No. 3,062,910. Such pressure relief devices include a thin metal diaphragm which is punctured when an excessively high gas pressure is created in the cell.

It is an object of my invention to provide for sealed cells of the class described improved pressure relief means including a novel cover and separately formed diaphragm piercing means whereby precise, uniform location of the piercing means in relation to the diaphragm is facilitated and more reliable and uniform release of gas is obtained upon the development of a predetermined abnormally high internal gas pressure.

A particular object is to provide for a sealed, rechargeable electric cell pressure relief means comprising a metallic diaphragm and a sharp pin having a head projecting from the cell cover and adapted to function as an electric terminal contact, the pin being disposed to pierce the diaphragm upon the development of a predetermined pressure in the cell.

A further object is to provide a sealed cell having a pressure relief device including a thin metal diaphragm which is protected against accidental puncture by a novel cover and vent passage construction.

The invention also includes certain other novel features of construction which will be pointed out in the following specification and claims.

The accompanying drawing illustrates an embodiment of my invention which is particularly adapted for cells of small diameter. In the drawing:

FIGURE 1 is a central vertical sectional view showing the upper portion of a cell embodying my improved sealing and pressure relief device;

FIG. 2 is an exploded perspective view showing the several parts of a complete cell;

FIG. 3 is a perspective view showing one of the cells;

FIG. 4 is a part sectional view taken at a right angle to FIG. 1 and part elevational view showing the sub-assembly of cover and diaphragm piercing pin, and FIG. 5 is a top plan view detail of the annular cover.

In the drawing, the cell container which is subject to internal gas pressure is indicated generally at 7. It has a cylindrical wall 8 and a closed, integral bottom wall 9. Electrodes of conventional type within the casing may include a negative plate 10 and a positive plate 11, of the sintered plaque type, separated in a rolled arrangement by sheets 12 of separator material. Fitting within a rim portion 8a of the cylindrical wall 8 is an annular hard plastic gasket 13 having an integral annular flange 13a projecting within the cell. A thin diahpragm 14 constructed from corrosion-resistant metal and having an annular, upwardly turned rim 14a fits within the inner periphery of the gasket 13 and rests on the flange 13a. An annular cover indicated generally by the numeral 15 has a central portion 16 extending in spaced relation to the diaphragm 14. This cover has a central opening 17 and a downwardly offset periphery 18 engaging an inner peripheral surface of the diaphragm rim 14a.

My improved means for perforating the diaphragm 14 comprises a pin having a shank 19 projecting through the opening 17 below the cover portion 16 and a conical, pointed end portion 20, the point of which is normally located closely adjacent to the outer surface of the diaphragm 14. An annular coaxial head 21 is integral with and projects from the shank 20 exteriorly of the cover 15, and is rigidly secured to the outer side of the cover portion 16 by suitable means such as welding, brazing or soldering. Extending downwardly along the conical end portion 20 is a narrow channel shaped vent groove 22. As indicated in FIGS. 1 and 4, the lower end of the groove 22 is located a predetermined small fraction of an inch above the sharp point of the pin. The function of the groove 22 is to insure the escape of gas to vent when the diaphragm is deflected outwardly, by abnormally high gas pressure in the cell, sufficiently to cause perforation of the diaphragm. Gas may be vented to atmosphere from the chamber between the cover 15 and diaphragm 14 through a passage along the shank 19 through the opening 17 and including radial grooves 23 extending beneath the pin head 21 in the cover portion 16 (FIGS. 4 and 5).

A reinforcing ring 24 encircles the outer surface of the rim portion 8a of the cylindrical wall 8 and a flange 25 is formed on the ring 24 to confine the gasket 13 within the rim portion 8a of the wall 8. Further details of the internal elements of the cell are shown in the exploded view, FIG. 2. These include insulator disks 26 and 27 disposed at the upper and lower ends respectively of the group of electrodes and separators. A negative electrode tab 10a and a positive electrode tab 11a are adapted to be passed through slots in the insulator disks 26 and 27 for electrical connection with members of the cell casing. Thus the tab 10a may be connected to the bottom wall 9 of the cell casing in conventional manner and the tab 11a may be similarly connected by welding or otherwise to the diaphragm 14, as indicated in FIG. 1.

To seal the assembly shown in FIG. 1, the reinforcing ring 24, rim portion 8a of the casing wall, gasket 13 and cover 15 are placed under sufficient radial compression to deform the gasket 13 against the outer periphery of the cover 15. Sufficient radial pressure is applied to extrude an annular portion of the gasket 13 above the upper periphery of the wall 8 and also to reduce the thickness of the gasket 13. The resulting radial compressive force exerted by the gasket 13 and rim 18 of the cover 15 on the rim 14a of the diaphragm 14 not only forms an effective and permanent seal at the periphery of the cover and diaphragm, but securely retains the diaphragm against withdrawal from engagement with the periphery of the cover 15.

By making the pin 19 separate from the cover 15 I am enabled to select materials for the pin and cover which are best suited to the functions to be performed by these components. The pin, for example, may be formed from a stainless steel which would be unsuited for use in the construction of the cover 15. The latter is preferably formed from cold rolled strip steel, e.g. low carbon SAE 108 or 110 and for alkaline cells may be nickel plated directly on the steel. Such a cover of suitable diameter and thickness has the required elasticity and strength to insure a lasting leakproof seal in conjunction with a gasket 13 of the character described. The annular head 21 of the pin located at the outer side of the cover is advantageous in that it affords means for not only accurately locating the pin point with respect to the cover and diaphragm, but also affords a terminal contact member at the outer side of the cover. This is particularly advantageous for sealed cells of small diameter, such as the A—A cells of approximately one-half inch outside diameter and sizes ranging up to D cells of approximately 1¼ inch outside diameter.

Cells of the type herein described must be capable of withstanding various predetermined internal gas pressures in excess of 150 pounds per square inch. It will be evident that the pressure relief device should be so designed as to avoid puncture of the diaphragm 14 during normal use of the cell when the internal gas pressure remains below a safe upper limit, usually on the order of 155–180 p.s.i. The present invention is uniquely effective in avoiding premature puncturing of the diaphragm while insuring relief of dangerously high internal gas pressure. As the internal pressure increases above a predetermined normal maximum the diaphragm 14 is deflected outwardly against the point of the pin. To prevent explosions resulting from occasional build-up of abnormally high internal cell pressures, the pin must perforate the sealed diaphragm only when a predetermined high pressure develops.

As indicated in FIG. 4, the elements defining the conical surface of the pin portion 20 form a 60 degree cone angle. A pin with a conical point of approximately 60 degrees is preferred for use in conjunction with a diaphragm formed from nickel plated strip steel, dead soft, of diameter within the range 0.43 inch and 0.77 inch and .007 inch thick.

Extensive tests have shown that the reliability of the pin to perforate the diaphragm at predetermined pressure is affected by the cone angle and that cone angles between 45 and 90 degrees are best suited for the purpose. Such points are much more reliable in operation than pins having a needle-like surface converging at a relatively small angle.

Tests further show that in the absence of a groove such as the groove 22 extending along the converging sides of the pin, the diaphragm occasionally remains in sealing engagement with the converging sides of the pin even after the point of the pin has perforated the diaphragm. When this occurs, the internal pressure may build up to the point where the cell container is ruptured before a change in the operating conditions allows the perforated diaphragm to be retracted from the pin point. This difficulty is obviated by providing the groove 22 which allows the gas to escape upon the build-up of a predetermined pressure sufficient to deflect the diaphragm upwardly to the elevation of the lower end of the groove. Thus the lower end of the groove 22 may be located at selected elevations above the diaphragm to facilitate the determination of the pressure at which a cell will be vented by rupture of a diaphragm constructed in accordance with predetermined specifications.

Venting of the cover chamber above the diaphragm through the grooves 23 extending radially from the central opening 17 effectively guards the diaphragm against accidental puncture by a wire or tool that may be used in the assembly of the cell with apparatus for which it is to furnish power.

I claim:

1. In a normally sealed electric cell having a container subject to internal gas pressure, said container including a cylindrical wall member, a gas-tight closure and pressure relief device comprising; an annular gasket of dielectric material fitting within said cylindrical wall member and having an annular inwardly projecting flange; a thin metallic diaphragm supported at the outer side of said flange and having an upwardly projecting peripheral rim engaging the inner periphery of said gasket; an annular cover having a central portion formed with a centrally located opening, extending in spaced relation to said diaphragm and a downwardly offset outer periphery engaging an inner peripheral surface of said rim; a pin having a head secured to said cover, a shank projecting through said opening in the cover, a pointed end normally positioned adjacent to the outer surface of said diaphragm, said diaphragm having sufficient strength to resist puncture by said pin under normal operating pressures in said cell; a vent passage extending along the shank of said pin and laterally between the head of the pin and the cover including a longitudinally extending groove on said shank, the lower end of which is spaced upwardly from the pointed end of the pin; and means confining said gasket under radial compression and in gas-tight sealing relation to said cylindrical wall member and to the rim of said diaphragm at the periphery of said cover, the central portion of said diaphragm being outwardly deflectable and breakable by said pin upon the development of a predetermined abnormally high gas pressure in said cell.

2. A pressure relief device for a sealed cell in accordance with claim 1 in which the head of said pin projects at the upper side of said cover and constitutes an electrode terminal.

3. A pressure relief device in accordance with claim 2 in which the head of said pin comprises an annular flange projecting from the shank of said pin and rigidly joined to the outer surface of said cover.

4. A pressure relief device in accordance with claim 3 in which said pin has a substantially conical pointed end portion, the sides of which diverge upwardly at an angle within the range 45 degrees to 90 degrees.

5. In a normally sealed electric cell having a container subject to internal gas pressure, said container including a wall member, a gas-tight closure and pressure relief device comprising: a gasket of dielectric material fitting within said wall member and having an inwardly projecting flange, a thin metallic diaphragm supported at the outer side of said flange and having an upwardly projecting peripheral rim engaging the inner periphery of said gasket; a cover having a vent opening over said diaphragm and in spaced relation thereto, with the outer periphery of said cover engaging an inner peripheral surface of said rim thereby forming with the diaphragm a chamber sealed along its peripheral edge; a pin having its head secured to said cover and a shank projecting toward said diaphragm and terminating with a pointed end normally positioned adjacent to the outer surface of said diaphragm, said diaphragm having sufficient strength to resist puncture by said pin under normal operating pressures in said cell; said pin containing therein a vent passage extending at least partially along the shank of the pin in communication with said vent opening; and means confining said gasket under radial compression and in gas-tight sealing relation to said wall member and to the rim of said diaphragm at the periphery of said cover; the central portion of said diaphragm being outwardly deflectable and penetrable by said pin upon the development of a predetermined abnormally high gas pressure in said cell.

6. In a pressure relief device for a sealed electric cell in accordance with claim 5 wherein the head of said pin projects at the upper side of said cover and said vent passage extends along the shank of said pin and laterally between the head of the pin and the cover and includes a longitudinally extending groove on the shank, the lower end of which is spaced upwardly from the pointed end of the pin.

References Cited by the Examiner

UNITED STATES PATENTS

| | | | |
|---|---|---|---|
| 2,922,833 | 1/60 | Philipp | 136—177 |
| 3,062,910 | 11/62 | Schenk | 136—133 |
| 3,064,065 | 11/62 | Belove | 136—133 |
| 3,081,367 | 3/63 | Field et al. | 136—133 |

WINSTON A. DOUGLAS, *Primary Examiner.*

JOHN H. MACK, *Examiner.*